United States Patent [19]

Gay

[11] Patent Number: 4,818,991
[45] Date of Patent: Apr. 4, 1989

[54] ELECTRO-OPTICAL DISPLAY SCREEN WITH CONTROL TRANSISTORS

[75] Inventor: Michel Gay, Le Fontanil, France
[73] Assignee: Thomson-CSF, Paris, France
[21] Appl. No.: 927,851
[22] Filed: Nov. 6, 1986
[30] Foreign Application Priority Data
 Nov. 15, 1985 [FR] France ................. 85 16935
[51] Int. Cl.⁴ .............................................. G09G 3/36
[52] U.S. Cl. ..................... 340/784; 340/805; 340/719
[58] Field of Search ............... 340/811, 784, 785, 789, 340/805, 719; 350/332, 333

[56] References Cited

U.S. PATENT DOCUMENTS

| | | | |
|---|---|---|---|
| 3,824,003 | 7/1974 | Koda et al. | 340/784 |
| 4,319,237 | 3/1982 | Matsuo et al. | 340/784 |
| 4,386,352 | 5/1983 | Nonomura et al. | 340/784 |
| 4,470,060 | 9/1984 | Yamazaki | 350/333 |
| 4,485,380 | 11/1984 | Soneda et al. | 340/784 |
| 4,525,710 | 6/1985 | Hoshi et al. | 340/784 |
| 4,537,471 | 8/1985 | Grinberg et al. | 350/332 |
| 4,694,287 | 9/1987 | Chenevas-Paule et al. | 340/805 |

*Primary Examiner*—Gerald L. Brigance
*Assistant Examiner*—Mahmoud Fatahiyar
*Attorney, Agent, or Firm*—Roland Plottel

[57] ABSTRACT

Electro-optical display screen with control transistors wherein a cell of liquid crystal is controlled by the transistors and the row conductors set on one side of the cell as well as by the column conductors (C1, C2) set on the other side of the cell. Each transistor (T11) has its electrode gate (cg11) connected to a row conductor (L1), its source (cs11) connected to a neighbouring row conductor (L2) and its drain (cd11) connected to an electrode of the cell (E11). In a screen of this type, there is thus no intersection between conductors on one and the same side of the screen, nor between additional control conductors, an arrangement that provides for easier access to the control conductors.

8 Claims, 7 Drawing Sheets

FIG_1
PRIOR ART
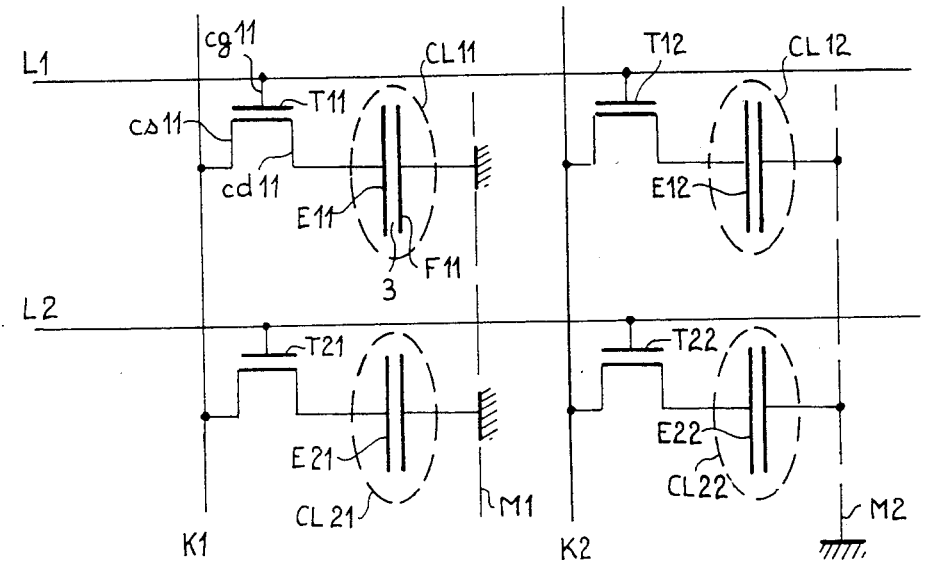
FIG_2
PRIOR ART
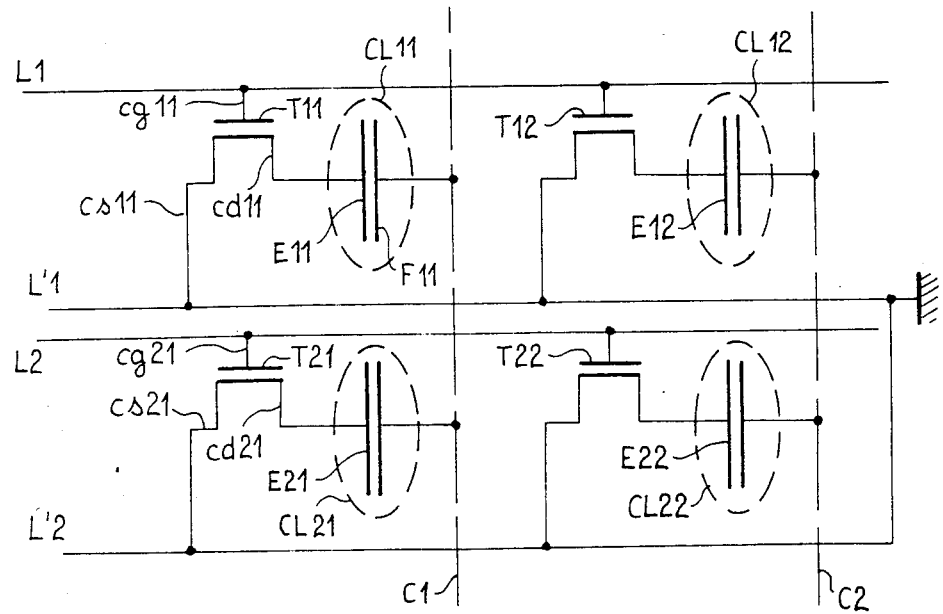

FIG_3 PRIOR ART
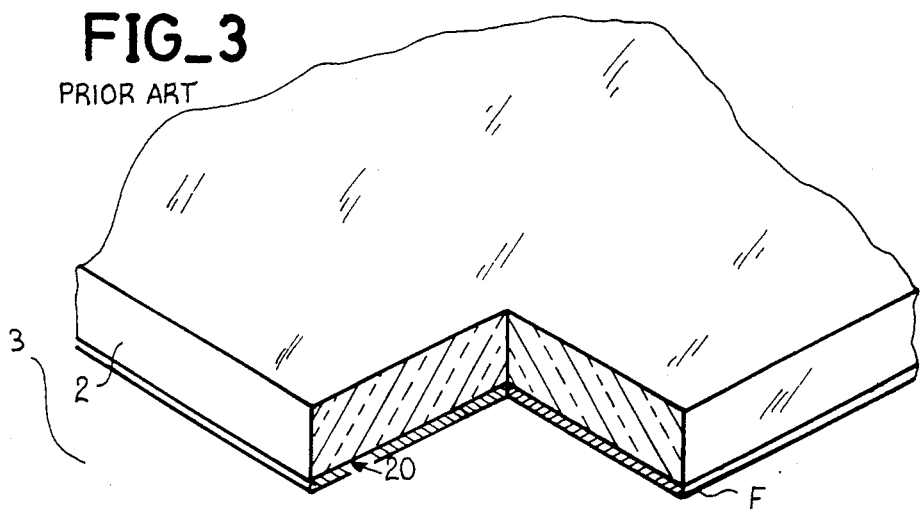
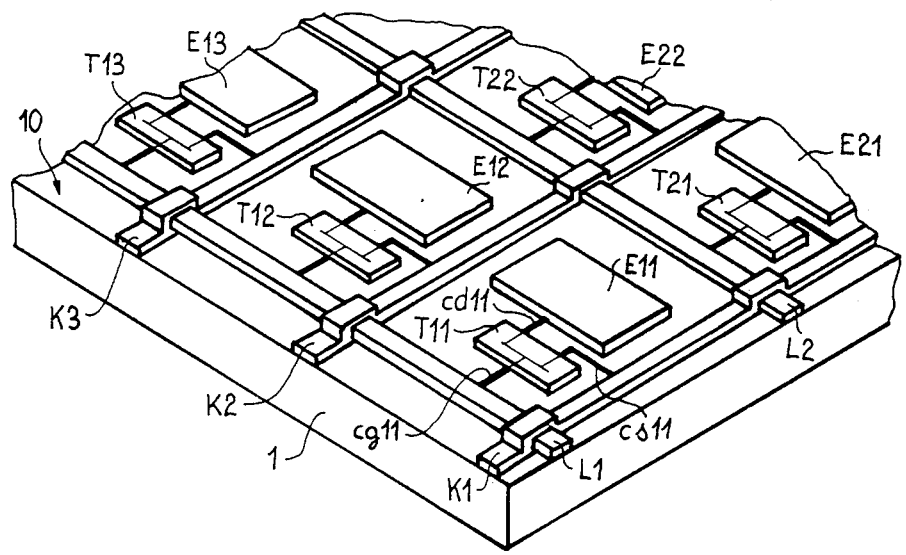
FIG_4 PRIOR ART
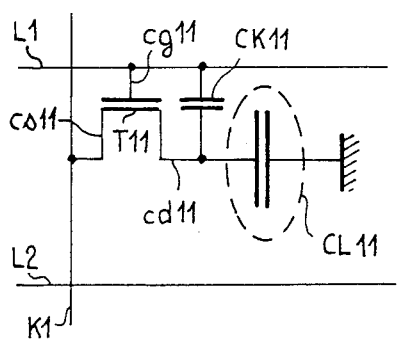
FIG_5 PRIOR ART
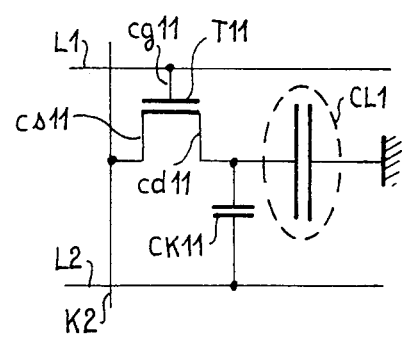

FIG_6
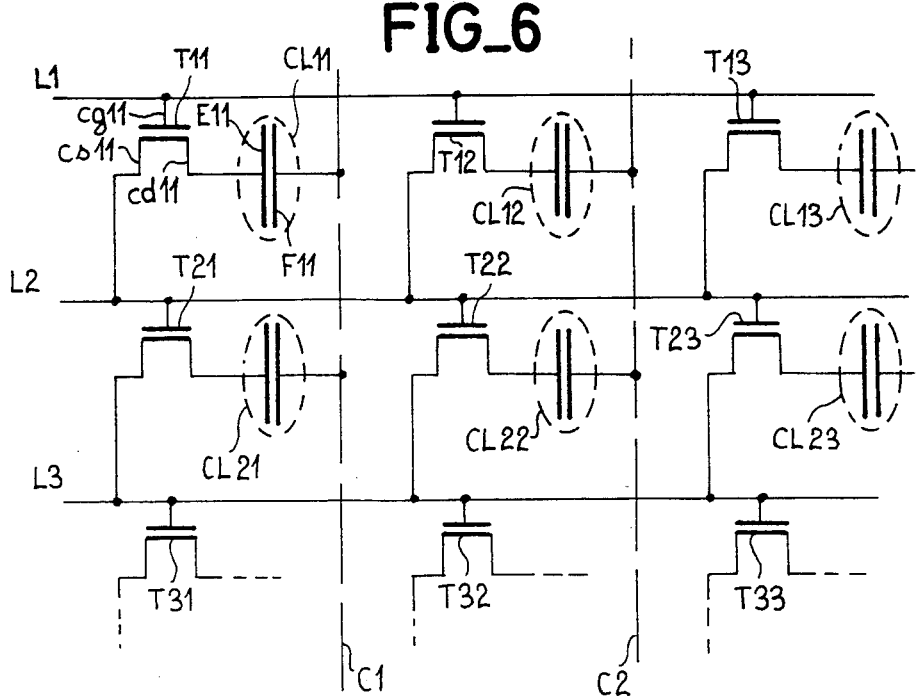
FIG_7
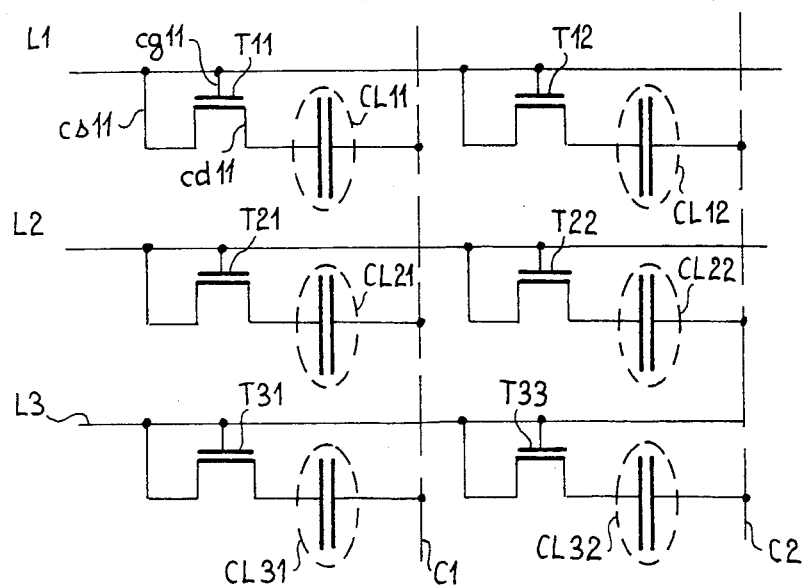

FIG_8
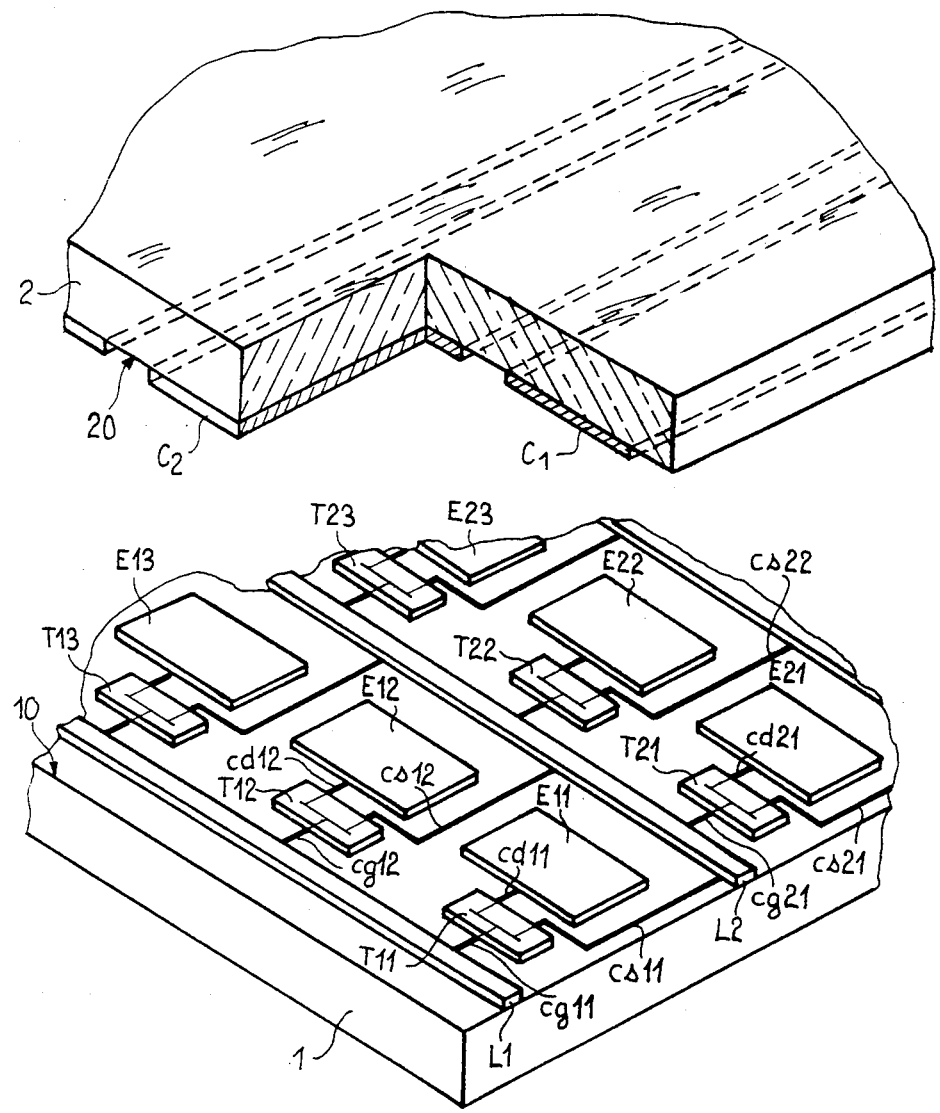

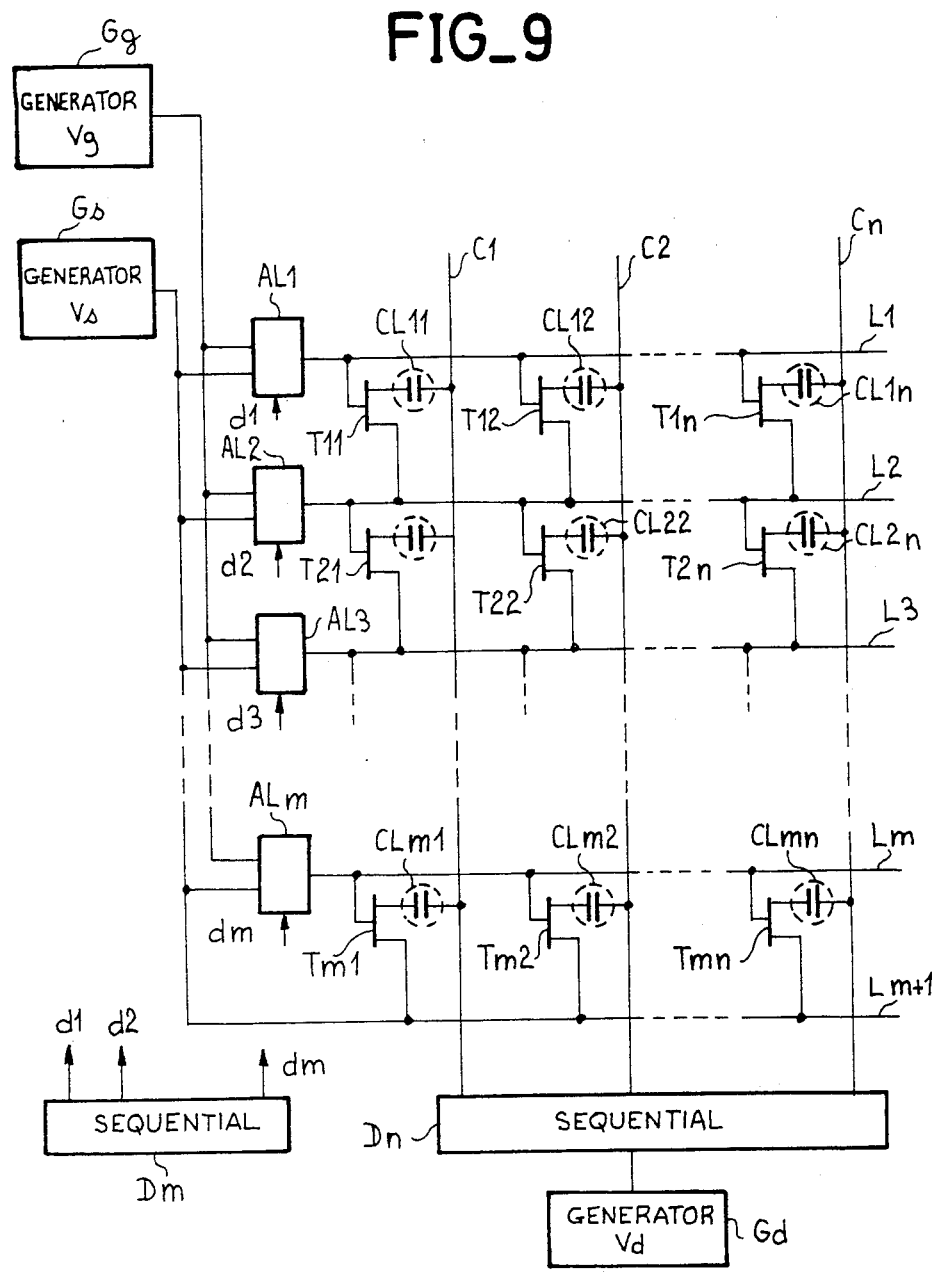
FIG_9

FIG_10
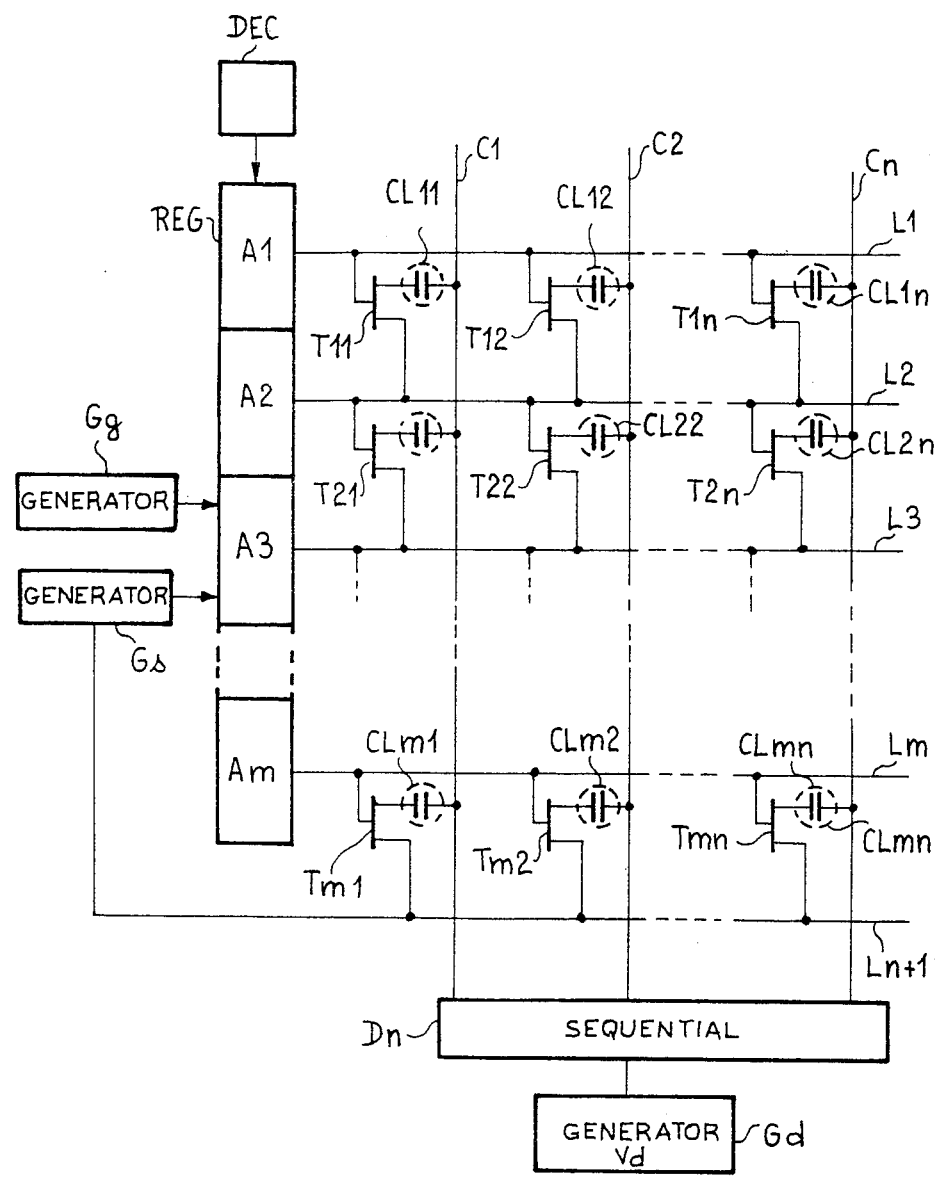

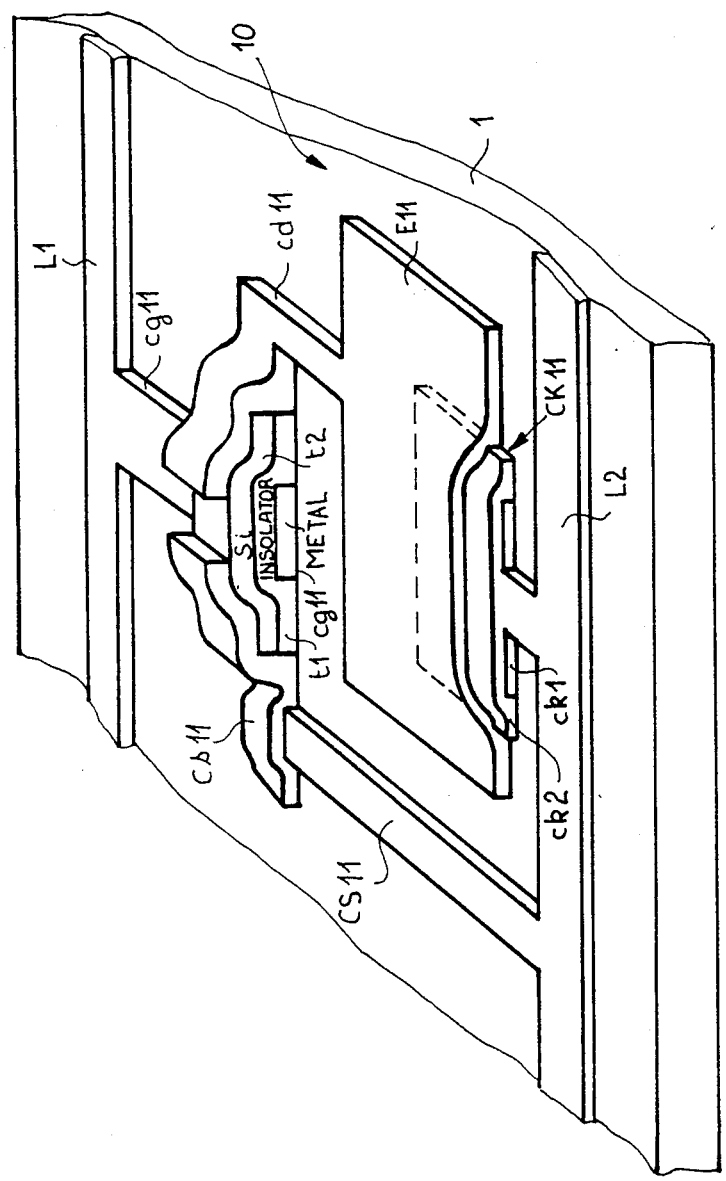
FIG_11

ELECTRO-OPTICAL DISPLAY SCREEN WITH CONTROL TRANSISTORS

BACKGROUND OF THE INVENTION

The invention concerns an electro-optical display screen using control transistors and, more especially, to a flat screen in which the control of each pixel to be displayed is provided by a control transistor. The invention can be applied to the building of large, liquid crystal flat screens, the control points of which are made by integration in the form of thin films.

In the prior art, these screens generally comprise a large number of square-shaped or rectangular-shaped elementary points or pixels. These pixels have to be addressed individually. The resolution of the screen depends on the number of pixels capable of receiving a datum. Each point is controlled by applying an electric field through the liquid crystal. For the display of alphanumeric or graphic data, matrix type displays have been proposed. Each pixel is then defined by the intersection of two systems of mutually perpendicular conductors known as rows and columns.

The addressing of these matrix display screens is becoming increasingly important in proportion to the degree to which their resolution (i.e. the number of pixels) is sought to be increased.

Since the pixels are addressed in a row-by-row sequence, the number of rows that can be addressed is generally limited by the electro-optical effect characteristics of the liquid crystal used. Thus, the possibility of addressing a large number of rows (>100) is achieved to the detriment of the other characteristics of the screen (i.e. by reducing contrast and increasing dependence on the angle of vision). To improve the efficiency of these screens, a transistor or a non-linear element can be placed in series with each pixel (constituting a capacitor). The unit then behaves like a memory element.

Current technological requirements as regards display screens are for improved image resolution. For screens of the matrix display type, this fact leads us consider devices with a large number of addressing rows or columns. Their number can go up to 1024 or even more. This entails a concomitant increase in the number of control transistors. For batch production, it is particularly necessary to obtain high efficiency, good reproducibility and high stability of these components. It is further necessary to suit (again with good reproducibility) the electrical characteristics of the component to those of the associated cell.

A currently usual way of coping with this problem is to do the addressing by means of a matrix of thin-film transistors: this means coupling the electro-optical effect directly to a giant (but low-resolution) "integrated circuit" which has the task of switching and storing data.

This approach raises definite technological difficulties in the making of both the thin-film transistors and the interconnecting conductor levels. In particular, it is imperative that none of the numerous intersections between the rows and columns of the interconnection network should be defective.

For, in a commonly-employed technique, the transistors are located at the points where the row conductors intersect the column conductors which are insulated from one another, such that a suitable difference in potential applied between a row and a column determines the conduction of the transistor connected between this row and this column.

However, this mode of embodiment as described in the American Pat. No. 3 824 003 published on 16 July 1974, can give rise to short circuits between a row and a column, making the liquid crystal cell at the intersection between this row and this column inoperative.

To avoid this risk of a short circuit, it was proposed, as described in the French patent application No. 2 553 218 published on 12 Apr. 1985, to eliminate any intersection between a row conductor and a column conductor on the same side of a liquid crystal cell. To do so, it was planned to duplicate the row conductors on the surface of the cell that bears the transistors and to transfer the column conductors to the other surface of the liquid crystal cell. Thus, two row conductors would be associated with each row of transistors. A transistor has, for example, its gate electrode connected to one of the row conductors, its source connected to the other row conductor and its drain connected to the column conductor by means of the liquid crystal cell.

However, this solution has the disadvantage of doubling the number of row conductors. Moreover, this increase in row conductors makes it more difficult to gain access to the ends of these conductors.

The invention therefore pertains to a device to mitigate these disadvantages by simplifying the structure of the addressing matrices with thin-film transistors.

SUMMARY OF THE INVENTION

The invention therefore concerns an electro-optical display screen with control transistors comprising:

a first plate and a second plate parallel to each other and enclosing an electro-optical material;

the first plate being provided, on its side which is in contact with the electro-optical material, with a matrix of electrodes arranged in rows and columns, with row-controlling conductors at a rate of one conductor which is associated with each row of electrodes of the said matrix and is set parallel to each row of electrodes, and with control transistors at a rate of one transistor per electrode, coupling this electrode to the said row control conductor;

the second plate being provided, on its surface which is in contact with the electro-optical material, with column conductors each corresponding to a column of the electrodes matrix on the surface of the first plate;

each control transistor possessing at least one drain, one gate electrode and one source, the flat-faced display screen being further provided with power supply circuits for the said drain, gate electrode and source, with each control transistor having its drain connected to an electrode of a first row of the matrix, its gate electrode connected to the row control conductor associated with the said electrodes row, the source being connected to a row control conductor of a second row that neighbours the previous conductor; the device comprising:

a sequential circuit to power the rows, providing for a connection, at every instant, between the gate electrode powering circuit and a row control conductor while the source powering circuit is connected to the said neighbouring row control conductor; and also comprising a connection circuit to connect the drain powering circuit with the column conductors.

BRIEF DESCRIPTION OF THE DRAWINGS

The various objects and characteristics of the invention will now be described in detail with reference to the appended drawings, namely:

FIG. 1, a simplified diagram of a control matrix of a liquid crystal screen according to the prior art wherein the row and column control conductors intersect each other on one and the same side of the liquid crystal cell;

FIG. 2, a simplified diagram of a control matrix of a liquid crystal screen according to the prior art wherein the row and column control conductors are separated by the liquid crystal cells;

FIG. 3, a perspective view of a mode of embodiment of a liquid crystal screen of the prior art, conforming to the diagram of FIG. 1;

FIGS. 4 and 5, simplified diagrams providing for intersection point storage capacitors according to the prior art;

FIG. 6, a simplified diagram of a control matrix of a liquid crystal screen according to the invention;

FIG. 7, a simplified diagram of an alternative embodiment of a control matrix of a liquid crystal screen according to the invention;

FIG. 8, a perspective view of a liquid crystal screen, conforming to the diagram of FIG. 6;

FIG. 9, a simplified diagram of a power circuit of a display screen according to the invention;

FIG. 10, a simplified diagram of an alternative embodiment of the invention according to the invention.

FIG. 11, an example of an embodiment of an intersection point of the display screen according to the invention.

DETAILED DESCRIPTION OF THE INVENTION

Referring to FIG. 1, we shall first describe a simplified diagram of a transistor-controlled matrix of a liquid crystal screen.

As is known in the prior art, a liquid crystal screen essentially comprises two glass plates enclosing a liquid crystal. The internal sides of these plates, which are in contact with the liquid crystal, bear the circuits of the liquid crystal screen.

The screen control matrix is located on one of these sides. As depicted in FIG. 1, it comprises row conductors L1 and L2 and column conductors K1 and K2. The row and column conductors intersect each other without there being any connection between them. A transistor is connected at each intersection between a row conductor and a column conductor. This transistor has its gate electrode connected to a row and its source to a column. Thus a transistor T11 is connected at the intersection of the row L1 and the column K1: this transistor has a gate electrode connected by a gate electrode connection cg 11 to the row L1 and a source connected by a source connection cs11 to the column K1. On the same side of the screen as the rows L1 and L2, the columns K1 and K2 and the transistors T11, metallic electrodes are set at the intersection between each row and each column. Each of these electrodes is connected to the drain of a transistor previously described. Thus, at the intersection between the row L1 and the column K1, an electrode E11 is connected by a drain connection cd11 to the drain of the transistor T11.

There is an electrode set on the other side of the screen, facing each electrode such as F11. This electrode is connected to the ground. In practice, the electrodes of this side, since they are connected to the ground, are all formed of one and the same ground plate.

A screen configuration of this type is depicted in perspective in FIG. 3. This figures shows the row conductors L1 and L2 and the column conductors K1, K2 and K3 on a side 10 of an initial strip 1. Connected substantially to each intersection point, there are also transistors and electrodes such as the transistor T11 and the electrode E11 located at the intersection of the row conductor L1 and the column conductor K1.

A second strip 2, preferably made of glass, determines a space 3 with one of the sides 20 and the side 10 of the strip 1, a liquid crystal being placed in this space 3.

The side 20 has a ground plate which is also transparent. An electrode of the side 10, such as E11, the ground plate facing this electrode and the liquid crystal which separates them constitute a liquid crystal cell CL11 of the screen.

The functioning of such a screen is known in the prior art. It may be recalled that, to display a datum on a liquid crystal cell, it is necessary to apply suitable potentials to a row (L1 for example) and a column (K1 for example) making the transistor T11 conductive. This transistor T11 then applies a potential to the electrode E11 in such a way that the electrodes E11 and F11 of the cell CL11 are subjected to a difference in potential providing for a change in the state of the liquid crystal of the cell CL11.

For this screen to work properly, there should be no contact between the row conductors L1 and L2 and the column conductors K1, K2 and K3. As can be seen in FIG. 3, these conductors must therefore be suitably insulated to prevent such contact, either directly at the intersection points or through the liquid crystal.

To prevent intersections between row conductors and column conductors, the method known in the prior art, as described in the French patent application No. 2 553 218 published on 12 Apr. 1985, is to duplicate the row conductors.

A solution of this type is depicted in FIG. 2. This figure reproduces the network of the row conductors L1 and L2, the matrix of transistors T11, T12, T21 and T22 and the matrix of electrodes E11, E12, E21 and E22. In addition to these elements laid out on the side 10 of strip 1 of the liquid crystal screen, there is a second system of row conductors L'1, L'2 arranged parallel to the row conductors L1, L2. The source connections then connect the sources of the transistors to these row conductors L'1, L'2. It is thus that the electrode gate of the transistor T11 is connected to the row conductor L1, that its source is connected to the row conductor L'1 and that its drain is connected to the electrode E11.

On the side 20 of the second strip 2 of the screen, the electrodes F11 to F22 are connected to electrode conductors C1, C2.

The row conductors L'1 and L'2 are connected to a reference potential such as the ground. The functioning of this screen and the control of a liquid crystal CL11 are obtained by applying suitable potentials to the row conductors such as L1 and the column conductors such as C1.

It must be noted that, in the types of screens described above, a storage capacitor is provided at each intersection point making it possible to increase the memory effect of each liquid crystal cell. FIGS. 4 and 5 depict an intersection point of the type of screen shown in FIG. 1. In FIG. 4, a storage capacitor CK11 has been connected between the drain of the transistor T11 and the row conductor L1. It is possible, as depicted in FIG. 5, to connect a storage capacitor CK11 between the drain of the transistor T11 and a neighbouring row conductor L2.

As can be noted from the above description, manufacturing a screen of a type known to the prior art requires the setting, on one and the same side of the liquid crystal screen, either of networks of conductors which intersect one another but are insulated from one another or of two row conductor networks.

The invention pertains to a display screen with a simpler structure, hence a structure which is easier to make and less liable to suffer manufacturing defects, i.e. a structure that is therefore more reliable.

Referring to FIGS. 6 and 8, we shall describe an example of an embodiment of a screen according to the invention.

This screen comprises two glass strips 1 and 2, set parallel to each other. An electro-optical material 3 is placed between these two glass strips 1 and 2, and is in contact with the sides 10 and 20 of these glass strips.

A matrix of electrodes, E11 to E23, arranged in rows and columns, is set on the side 10 of the strip 1. Row conductors L1 to L3 are set parallel to the electrode rows.

A transistor T11 to T23 is associated with each electrode. The electrode gate of each transistor of a row is connected to an associated row conductor. The source of these transistors is connected to a neighbouring row conductor. The drain of each transistor is connected to the electrode associated with the transistor.

It is thus that the electrode gate of the transistor T11 is connected by an electrode gate connection cg11 to a row conductor L1, that the source of this transistor is connected by a source connection cs11 to the following row conductor L2 and that the drain is connected to an electrode E11 by a drain connection cd11.

The side 20 of the strip 2 carries electrodes facing the electrodes E11 to E23. FIG. 6 depicts an electrode, such as F11, facing each electrode E11 to E23. A couple of electrodes, such as E11-F11, and the liquid crystal located between these electrodes constitute a liquid crystal cell CL11. The electrodes of the side 20 constituting one and the same column are connected to a column conductor C1, C2.

In FIG. 8, the electrodes of the side 20 are made in the shape of elongated electrodes C1, C2, each corresponding to a column of electrodes of the side 10. Each electrode C1, C2 thus also takes the place of a column conductor.

A cell, CL11 for example, is controlled by applying an electrode gate control potential Vg to a row, L1, according to the example and then a source supply potential Vs to a row in the following array, hence the row L2 according to the same example. Furthermore, a drain potential is applied to the column conductor (or column electrode) C1.

For example, a transistor such as T11 becomes conductive for an electrode gate potential of about $Vg = 15$ volts and for a drain-source voltage of about $Vd - Vs = 5$ volts.

The functioning of a cell implies that the control of a row of cells prevents the control of neighbouring rows of cells owing to the fact that the various transistors are connected between two row conductors. This calls for a sequential functioning of the screen of the invention, i.e. a sequential control of the various rows of the screen.

Furthermore, even though this is not depicted in the figures, it is possible to connect, for each transistor, a storage capacitor between the drain connection cd11 of the transistor and the row conductor L1 to which its electrode gate conductor is connected, or else to connect this storage capacitor between the drain connection cd11 and the row conductor L2 to which its source conductor is connected.

Referring to FIG. 9, we shall therefore now describe the circuits through which the screen of the invention can be made.

This figure depicts a screen comprising a matrix of m×n cells arranged in m rows and n columns. With these cells are associated m×n transistors T11 to Tmn.

These cells are controlled by means of m+1 row conductors L1 to Lm+1 and n column conductors C1 to Cn.

Three generators, Gg, Gs and Gd, supply appropriate electrode gate, threshold and drain potentials respectively for the conduction of the transistors.

The generators Gg and Gs can be connected to the row conductors L1 to Lm by connection circuits AL1 to ALm. A connection circuit AL1 to ALm connects the generator Gg to the corresponding row conductor when it receives a level 1 control signal at its input d1. When it receives a level 0 signal instead of a level 1 signal, it connects the generator GS, instead, to the row conductor.

A distributor Dm supplies a level 1 signal to a single output d1 to dm. It gives this signal successively to all the outputs d1 to dm. When it delivers a level 1 signal to an output, it delivers a level 0 signal to all the other outputs. Hence a single connection circuit, AL1 to AKm one at a time, connects the generator Gg to a row conductor while the other connection circuits connect the generator Gs to the other row conductors.

A generator Gd is used to provide a simultaneous power supply, at different voltage levels, to the column conductors thus determining the control of the transistors and of their associated cells at differing voltage levels.

The circuit of FIG. 9 can thus be used to set up a row-by-row sequential control of the screen. For example, when the distributor Dm delivers a level 1 signal at its output d1 and a level 0 signal at all its other outputs, only the connection circuit A11 connects the generator Gg to the row conductor L1, the other connection circuits (and especially AL2) connect the generator Gs to the other row conductors L2 to Lm. The row conductor L1 is at the potential Vg and the other row conductors are all at the potential Vs.

The distributor Dn supplies each column conductor with a specific control potential provided by the generator Gd. The cells of the row L1 are thus each controlled at a particular voltage level.

The transistors T11 to T12, located at the intersection points of the row conductor L1 and the controlled column conductors C1 and C2, are made conductive and the associated cells, CL11 and CL12, change their state.

The distributor Dm then delivers a level 1 signal at the output d2. The connection circuit AL2 connects the generator Gg to the row conductor L2 while the generator Gs is connected to the other row conductors. The distributor Dn connects the generator Gd to the appropriate column conductors C1 to Cn, determining the control of the cells connected to the row conductor L2.

The screen matrix is thus explored row by row.

The distribution of connection controls to the connection circuits AL1 to ALm can be done simply, as depicted in FIG. 10, by means of a shift register REG.

This register REG has as many stages A1 to Am as there are row conductors. It is powered by a generator Gg, delivering an electrode gate potential Vg and a generator Gs delivering a threshold potential Vs.

A row conductor L1 to Lm is connected to each stage A1 to Am. When a stage is at the state 0, it supplies a source potential Vs at the row conductor which is connected to it. When a stage is at state 1, it delivers an electrode gate potential at the row conductor.

A control circuit DEC delivers a logic 1 level signal to an input of the first stage and controls its shift in the successive stages of the register, controlling the supply of the potential Vg to the successive row conductors L1 to Lm, with only one row conductor at a time being at the potential Vg while the others are at the potential Vs. The power supply, by the generator Gd and the distributor Gn, of the row conductors C1 to Cn, is provided as described with reference to FIG. 9. Thus a sequential row-by-row control of the screen is achieved.

According to an alternative embodiment of the invention, the sources of the transistors of one row of the screen matrix, instead of being connected to a row conductor of the following array, are connected to the same row conductor as the electrode gates of the same transistors. Thus a matrix, such as the one depicted in FIG. 7, is obtained.

In this mode of embodiment, the control potential applied to a row conductor may be about Vg=15 volts while the control potential applied to a column conductor would then be substantially lower, for example Vd=about 5 volts.

An intersection point according to the invention and its transistor such as T11 can be made in the manner depicted, as an example, in FIG. 11.

This FIG. 11 again depicts the row conductors L1 and L2 as well as the electrode E11 set on the side 10 of the plate 1.

A metallic conductor or electrode gate connection cg11 is connected to the row conductor L1. A coat t1 of insulating material and a coat t2 of semi-conducting material such as non-doped amorphous silicium are successively laid crosswise on this electrode gate connection.

Furthermore, another metallic conductor CS11 is connected to the row conductor L2.

A metallic conductor or source connection cs11 is used to connect the metallic conductor CS11 to the coat t2 of the semiconductor.

Similarly, another metallic conductor or drain connection cd11 is used to connect the electrode E11 to the coat t2 of the semiconductor, thus creating the transistor channel.

The intersection point of the invention is thus made.

Furthermore, FIG. 11 depicts the embodiment of a storage capacitor CK11 integrated into the device according to the invention. For this, before laying the electrode E11, a conductive element ck1 connected to the row conductor L2 is provided on the side 10 of the plate 1. The conducting element ck1 is coated with a layer of insulating material ck2. The electrode ck1 is laid on the unit formed by the conducting element ck1 and the insulating material ck2 to constitute a storage capacitor.

It must be noted that, in the examples described above, it is planned to connect the transistor sources to row conductors while the drains are connected to column conductors. These connections can be reversed, it being understood that the directions of the power supply would then also be reversed.

What is claimed is:

1. Electro-optical display screen using control transistors comprising: a first plate and a second plate, parallel to each other and enclosing an electro-optical material; the first plate being provided, on its side which is in contact with the electro-optical material, with a matrix of first display cell electrodes (E11, E12 . . . ) arranged in rows and columns, and with row control conductors (L1, L2 . . . ) having one conductor associated with each row of said electrodes of said matrix and arranged parallel to each row of said electrodes, and with control transistors (T11, T12 . . . ) each of said transistors being connected to one of said display cell electrodes and coupling that electrode to one of the row control conductors; the second plate being provided, on its surface which is in contact with the electro-optical material, a matrix of desired display cell electrodes (F11, F12, . . . ) arranged in rows and columns corresponding to said first display electrodes, with column conductors (C1, C2 . . . ) each corresponding to a column of the matrix of electrodes; each control transistor possessing at least one drain, one gate electrode and one source; power supply circuits (Gd, Gg, Gs) for said drain, gate electrode and source; each of said control transistors having its drain (Cd11) connected to a display cell electrode (E11 . . . ) of the matrix, its gate electrode (cg11) connected to the control conductor (L1 . . . ) of said row associated with said electrode, the source being connected to a control conductor (L2 . . . ) of a row (L2 . . . ), which is the neighbor to the previous control conductor (L1 . . . ) and to which is also connected the gate electrode of the succeeding transistor in the same column; a sequential circuit (Dm) to power the rows, providing for a connection, at every instant, between the gate electrode power supply circuit (Gg) and a row control conductor, while the source power supply circuit (Gs) is connected to said neighboring row control conductor, and a connection circuit (Dn) to connect the drain power supply circuit (Gd) with the column electrodes.

2. Electro-optical display screen using control transistors comprising: a first plate (1) and a second plate (2), parallel to each other and enclosing an electro-optical material (3); the first plate being provided, on its side (10) which is in contact with the electro-optical material, with a matrix of display cell electrodes (E11, E12 . . .) arranged in rows and columns, and with row-controlling conductors (L1, L2 . . .), each conductor being associated with each row of display cell electrodes of the matrix and being set parallel to each row of said electrodes, and with control transistors (T11, T12 . . .) coupling said electrodes to said row control conductors; the second plate (2) being provided, on its surface (20) which is in contact with the electro-optical material, with column conductors each corresponding to a column of the matrix of display cell electrodes ($F_{11}$, $F_{12}$ . . .) arranged in rows and columns on the surface of the first plate; each control transistor having a drain connected to a display cell electrode of the matrix, and having its gate electrode and its source connected to the row conductor associated with said row display cell electrodes to which its drain is connected.

3. Electro-optical display screen according to claim 1 wherein the connection circuit connects various voltage supply levels, provided by the drain power supply circuit, to the column electrodes.

4. Electro-optical display screen according to claim 1 wherein the sequential circuit (Gg) for powering the rows successively connects the power supply circuit for the electrode gates ($Cg_{11}$...) to a row control conductor, the other row control conductors being then connected to the source power supply circuit (Gs).

5. Electro-optical display screen according to claim 4 wherein the sequential circuit comprises: a shift register (A1 ... Am) having many stages (m), each stage having one output connected to the corresponding row control conductors (L1 ... Lm), a control circuit which controls the shifting of datum in the shift register, each stage powered from said gate electrode power supply circuit when it receives said datum and power from said source power supply circuit when it does not receive said datum.

6. Electro-optical display screen according to claim 1 wherein each transistor comprises: an electrode portion of said gate electrode; a transistor element arranged crosswise to said electrode portion and having at least one layer of insulating material (t1) and one layer of semiconductive material (t2); drain and source members connecting the layer of semi-conductive material to said neighboring row conductor and to the display cell electrode while, at the same time, forming a transistor channel with the electrode-gate portion and the two layers.

7. Electro-optical display screen according to claim 1 further comprising, for each transistor, a storage capacitor connecting the drain of the transistor to the control conductor connected to the source of the transistor.

8. Electro-optical display screen according to claim 1 comprising, for each transistor, a storage capacitor connecting the drain of the transistor to said control conductor of said neighboring row.

* * * * *